(12) United States Patent
Kang (10) Patent No.: US 10,564,743 B2
(45) Date of Patent: Feb. 18, 2020

(54) TOUCH SENSOR DEVICE HAVING A CIRCULAR TOUCH SENSING AREA

(71) Applicant: Samsung Display Co., Ltd., Yongin-si (KR)

(72) Inventor: Sung Ku Kang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 83 days.

(21) Appl. No.: 14/854,618

(22) Filed: Sep. 15, 2015

(65) Prior Publication Data

US 2016/0291710 A1    Oct. 6, 2016

(30) Foreign Application Priority Data

Mar. 30, 2015   (KR) .................. 10-2015-0044556

(51) Int. Cl.
*G06F 3/041*        (2006.01)
(52) U.S. Cl.
CPC .................... *G06F 3/041* (2013.01)
(58) Field of Classification Search
None
See application file for complete search history.

(56) References Cited

U.S. PATENT DOCUMENTS

| 8,440,920 B2 | 5/2013 | Bulea et al. | |
| 2009/0273573 A1* | 11/2009 | Hotelling | G06F 3/0362 345/173 |
| 2011/0210936 A1 | 9/2011 | Wang et al. | |
| 2011/0248954 A1* | 10/2011 | Hamada | G06F 3/03547 345/174 |
| 2011/0267300 A1* | 11/2011 | Serban | G06F 3/03547 345/174 |
| 2012/0313892 A1* | 12/2012 | Philipp | G06F 3/03547 345/174 |
| 2015/0234499 A1* | 8/2015 | Hu | G06F 3/044 345/174 |
| 2016/0178949 A1* | 6/2016 | Wang | G02F 1/13338 349/12 |
| 2016/0209956 A1* | 7/2016 | Besshi | G06F 3/0338 |

FOREIGN PATENT DOCUMENTS

| KR | 10-2013-0105511 | 9/2013 |
| KR | 10-2014-0022584 | 2/2014 |

* cited by examiner

*Primary Examiner* — Amr A Awad
*Assistant Examiner* — Donna V Lui
(74) *Attorney, Agent, or Firm* — H.C. Park & Associates, PLC (57) ABSTRACT

A touch sensor device includes a touch sensing area including touch sensors sequentially disposed in a first direction extending away from an imaginary central point, in which an area of each touch sensors gradually increases as a distance thereof away from the imaginary center point increases, at least one of the touch sensors includes a first touch electrode and a second touch electrode adjacent to each other, a width of the first touch electrode decreases along a second direction, and a width of the second touch electrode increases along the second direction.

10 Claims, 6 Drawing Sheets

TOUCH SENSOR DEVICE HAVING A CIRCULAR TOUCH SENSING AREA

CROSS-REFERENCE TO RELATED APPLICATION

This application claims priority from and the benefit of Korean Patent Application No. 10-2015-0044556, filed on Mar. 30, 2015, which is hereby incorporated by reference for all purposes as if fully set forth herein.

BACKGROUND

1. Field

Exemplary embodiments of the present invention relate to a touch sensor device, and more particularly, to a touch sensor device including a circular touch sensing area and a display device including the same.

2. Discussion of the Background

An electronic device, such as a liquid crystal display (LCD), an organic light emitting diode (OLED) display, and an electrophoretic display may include a touch sensing function, such that a user may interact with the electronic device. The touch sensing function may determine whether a user finger, etc., touches a screen, and touch position information thereof, by sensing a change of pressure, light, etc., that occurs on a screen in the display device, when the user contacts the finger or a touch pen to the screen to write a character or to draw a picture.

The touch sensing function may be realized through a touch sensor. The touch sensor may be classified into various types, such as a resistive type, a capacitive type, an electro-magnetic (EM) type, and an optical type.

The capacitive touch sensor may include a sensing capacitor formed by a sensing electrode that may transfer a sensing signal, and sense a change in capacitance of the sensing capacitor generated when a conductor such as a finger approaches the touch sensor, to determine existence of a touch, a touch position, and the like. The capacitive touch sensor may include touch electrodes disposed in a touch sensing area sensing the touch, and touch wires connected to the touch electrodes. The touch wires may transmit a sensing input signal to the touch electrode and transmit a sensing output signal of the touch electrode generated depending on the touch to a touch driver.

The touch sensor may be installed in the display device (an in-cell type), may be formed on an outer surface of the display device (an on-cell type), or may be attached to a separate touch sensor panel of the display device (an add-on cell type).

A touch electrode constituting a touch sensor may be disposed at a touch sensing area that may sense a touch, and the touch sensing area may overlap with a display area for displaying an image in a display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch sensor device, and a display device including the same, of which a structure of the touch sensor device includes a touch sensing area having a non-quadrangular (e.g., circular or elliptical) shape that may be capable of sensing multiple touches, precisely sense a touched position, and increase price competitiveness.

Additional aspects will be set forth in the detailed description which follows, and, in part, will be apparent from the disclosure, or may be learned by practice of the inventive concept.

According to an exemplary embodiment of the present invention, a touch sensor device includes a touch sensing area including touch sensors sequentially disposed in a first direction extending away from an imaginary central point, in which an area of each touch sensors gradually increases as a distance thereof away from the imaginary central point increases, at least one of the touch sensors includes a first touch electrode and a second touch electrode adjacent to each other, a width of the first touch electrode decreases along a second direction, and a width of the second touch electrode increases along the second direction.

The second direction may be a clockwise or counterclockwise direction with respect to the imaginary central point.

The touch sensing area may be divided into domains by at least one imaginary boundary line, and the touch sensors may be respectively disposed in each domain.

An outer side edge of the touch sensor may together form a circle, an ellipse, or an arc with respect to the imaginary central point.

The first touch electrode and the second touch electrode may be disposed on the same layer, and may include the same material.

The touch sensor device may further include touch wires connected to the touch sensors, and at least one touch driver connected to the touch wires.

A first portion of the touch wires may be disposed in a peripheral area outside the touch sensing area.

A second portion of the touch wires may be disposed in a boundary area between adjacent domains.

The touch wires may be disposed on the same layer as the first and second touch electrodes, and may include the same material as the first and second touch electrodes.

The touch wires may be connected to a side of the first or second touch electrode having a greater width.

The touch sensor device may further include touch wires connected to the touch sensors, touch drivers connected to the touch wires and disposed in a peripheral area outside the touch sensing area, in which each of the touch drivers may be disposed in a boundary area between adjacent domains.

The touch sensors may include a first touch sensor disposed closest to the imaginary central point, and the first touch sensor may include one touch electrode.

The touch electrode of the first touch sensor may have a substantially circular or fan shape.

The touch sensing area may be divided into domains by at least one imaginary boundary line, and the touch sensors may be respectively disposed in each domain.

An outer side edge of the first touch sensor may form an arc with respect to the imaginary central point.

According to the exemplary embodiments of the present invention, the touch sensor device and the display device including the same may have increased price competitiveness.

Further, a structure of the touch sensor device may provide a touch sensing area having a non-quadrangular (e.g., circular or elliptical) shape. In addition, the touch sensor device including the touch sensing area having the non-quadrangular (e.g., circular or elliptical) shape may sense touches made at multiple regions.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A display device according to exemplary embodiments of the present invention will be described with reference to FIG. 1 to FIG. 12.

Figure 1:
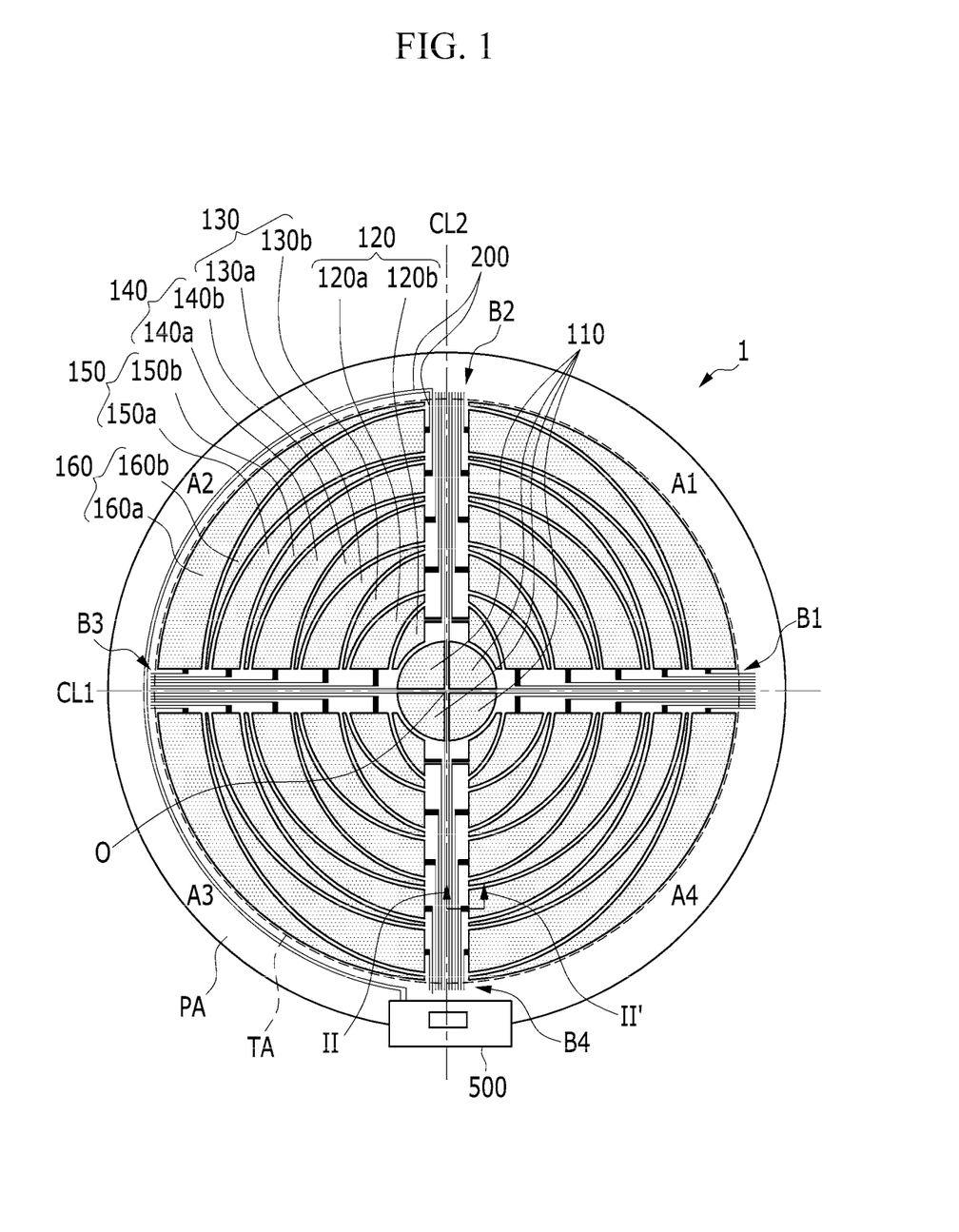
FIG. 1 is a top plan view of a touch sensor device according to an exemplary embodiment of the present invention.

FIG. 1 is a top plan view of a touch sensor device according to an exemplary embodiment of the present invention.

Referring to FIG. 1, the touch sensor device 1 according to the present exemplary embodiment may sense a contact made by an external object. The contact may include a direct touch, in which an external object such as a user's finger directly touches a touch surface of the touch sensor device 1, and a hovering touch, in which the external object approaches the touch sensor device 1 or hovers after the external object has approached the touch sensor device 1.

The touch sensor device 1 includes a touch sensing area TA that may sense a contact made by an external object and a peripheral area PA positioned outside the touch sensing area TA, i.e., a periphery of the touch sensing area TA. The peripheral area PA may be referred to as a dead space. The peripheral area PA may not sense most contacts.

In the touch sensor device 1 of the present exemplary embodiment, a shape of the touch sensing area TA may be circular or elliptical.

An imaginary central point "O" may be disposed at the center of the touch sensing area TA, and may be divided into domains A1, A2, A3, and A4 by at least one of imaginary boundary lines CL1 and CL2 that extend through the central point O. When the touch sensing area TA has a circular shape, the central point O may be the center of the circular shape. FIG. 1 illustrates an example in which the touch sensing area TA is divided into four domains A1, A2, A3, and A4 by two boundary lines CL1 and CL2 that extend through the central point O. When the two boundary lines CL1 and CL2 that extend through the central point O are perpendicular to each other, areas of the divided domains A1, A2, A3, and A4 may be substantially the same.

Boundary areas B1, B2, B3, and B4 serving as peripheral areas of the boundary lines CL1 and CL2 that extend through the central point O may be formed between the adjacent domains A1, A2, A3, and A4.

A touch sensor may be disposed at each of the domains A1, A2, A3, and A4 of the touch sensing area TA, and shapes, dispositions, and the like of touch electrodes included in the touch sensors positioned at the respective domains may be the same. Alternatively, shapes, dispositions, and the like of the touch electrodes included in the touch sensors positioned at the respective domains may be different from each other.

The touch sensors positioned at one domain A1, A2, A3, or A4 include touch sensors 110, 120, 130, 140, 150, and 160, which are sequentially positioned to be further away from the central point O to the outside. According to an exemplary embodiment of the present invention, the number of the touch sensors may be increased or reduced according to a size, a touch resolution, or the like of the touch sensor device 1.

External or internal edges of the touch sensors 110, 120, 130, 140, 150, and 160 are curvedly formed, thereby constituting a circle, an ellipse, or an arc, or a bent edge having at least one vertex. When the touch sensing area TA has a substantially circular shape, a distance from the central point to the internal or external edge of each of the touch sensors 110, 120, 130, 140, 150, and 160 may be substantially constant.

A width of each of the touch sensors 110, 120, 130, 140, 150, and 160 may be substantially constant. However, widths of the touch sensors 110, 120, 130, 140, 150, and 160 positioned at each of the domains A1, A2, A3, and A4 may be the same or different from each other according to the position from the central point O. Herein, the widths of the touch sensors 110, 120, 130, 140, 150, and 160 may indicate a width of a half-line direction that starts from the central point O. When the widths of the touch sensors 110, 120, 130, 140, 150, and 160 positioned at each of the domains A1, A2, A3, and A4 are different from each other, the widths of the touch sensors 110, 120, 130, 140, 150, and 160 may be gradually increased or reduced farther away from the central point O.

The areas of the touch sensors 110, 120, 130, 140, 150, and 160 may be gradually widened as they are farther away from the central point O. As a result, at each of the domains A1, A2, A3, and A4, the first touch sensor 110 may have the smallest area, while the touch sensor 150 which is farthest away from the central point O may have the largest area.

The touch sensors 110, 120, 130, 140, 150, and 160 of different domains A1, A2, A3, and A4, which are positioned in substantially the same order from the central point O may be substantially aligned at boundaries between the domains A1, A2, A3, and A4. Particularly, when viewed from the touch sensing area TA, the touch sensors 110, 120, 130, 140, 150, and 160 positioned in substantially the same order from the central point O may be disposed substantially concentrically.

The first touch sensor 110 positioned closest to the central point O may have a circular or fan shape. As shown in FIG. 1, when generally viewed from the touch sensing area TA, the first touch sensors 110 may be formed together as a circle.

The touch sensors 110, 120, 130, 140, 150, and 160 positioned at substantially the same position from the central point O are physically and electrically separated from each other.

Each of the touch sensors 110, 120, 130, 140, 150, and 160 may include one touch electrode or a multiple touch electrodes. Referring to FIG. 1 according to the present exemplary embodiment, each of the touch sensors 120, 130, 140, 150, and 160, except for the first touch sensor 110, includes multiple touch electrodes.

Referring to FIG. 1, each of the touch sensors 120, 130, 140, 150, and 160, except for the first touch sensor 110, may include pairs of touch electrodes 120a and 120b, 130a and 130b, 140a and 140b, 150a and 150b, and 160a and 160b, respectively, which are adjacent to and face each other.

The pairs of touch electrodes 120a and 120b, 130a and 130b, 140a and 140b, and 150a and 150b, 160a and 160b, which are disposed to face each other included in each of the touch sensors 120, 130, 140, 150, and 160, except for the first touch sensor 110, have similar characteristics, and thus one touch sensor, e.g., the pair of touch electrodes 120a and 120b included in the second touch sensor 120, will be described hereinafter.

The width of a first touch electrode 120a of the pairs of the touch electrodes 120a and 120b is reduced in a first longitudinal direction, and the width of a second touch electrode 120b is reduced in a second longitudinal direction opposite to the first longitudinal direction. The touch sensor 120 is formed to have a substantially arch shape with respect to the central point O. Accordingly, the width of the first touch electrode 120a is gradually reduced in a clockwise direction with respect to the central point O and the width of the second touch electrode 120b is gradually reduced substantially in a counterclockwise direction. More particularly, in a first direction among the directions in which azimuthal angles are changed, the width of the first touch electrode 120a may be reduced and the width of the second touch electrode 120b may be increased.

The distance between the first touch electrode 120a and the second touch electrode 120b may be constant. Each of the first and second touch electrodes 120a and 120b may be formed to have a bent wedge or sickle shape, or a substantially triangular shape with respect to the central point O.

The first touch sensor 110 may include one touch electrode. The first touch sensors 110 positioned at the respective domains A1, A2, A3, and A4 may be formed to have a fan shape. Areas of the touch electrodes included in the first touch sensors 110 and the touch electrodes 120a and 120b, 130a and 130b, 140a and 140b, 150a and 150b, and 160a and 160b included in the touch sensors 120, 130, 140, 150, and 160 may be increased as a distance thereof to the central point O increases.

The touch sensor device 1 includes touch wires 200 connected to the touch electrodes included in the first touch sensors 110 and the touch electrodes 120a and 120b, 130a and 130b, 140a and 140b, 150a and 150b, and 160a and 160b included in the touch sensors 120, 130, 140, 150, and 160. The touch wires 200 may include portions positioned in boundary areas B1, B2, B3, and B4 formed between the adjacent domains A1, A2, A3, and A4 and/or portions positioned in the peripheral area PA.

The touch wires 200 may be connected to at least one touch driver 500 to receive driving signals or transfer touch signals generated according to touch sensing. The touch driver 500 may be disposed in the peripheral area PA. More specifically, the touch drivers 500 may be disposed in the peripheral area PA to correspond to regions formed between the adjacent domains A1, A2, A3, and A4. The touch driver 500 may include a circuit board and a driving circuit mounted or formed therein, or may be configured in various forms including a driving circuit integrated in the peripheral area PA.

For convenience of illustration, FIG. 1 illustrates portions of the touch wires 200 positioned in the peripheral area PA, but the remaining touch wires 200 extend from the illustrated portions to be connected to the touch driver 500. Particularly, as shown in FIG. 1, when the touch driver 500 is disposed at a region corresponding to the imaginary boundary line CL2, the touch wire 200 including a portion thereof positioned in the boundary area B4 close to the touch driver 500 may be directly connected to the touch driver 500 without extending toward the peripheral area PA.

The touch wires 200 connected to the touch electrodes 120a, 120b, 130a, 130b, 140a, 140b, 150a, 150b, 160a, and 160b may be connected to sides of the touch electrodes 120a, 120b, 130a, 130b, 140a, 140b, 150a, 150b, 160a, and 160b, which have the greatest widths.

Figure 2:
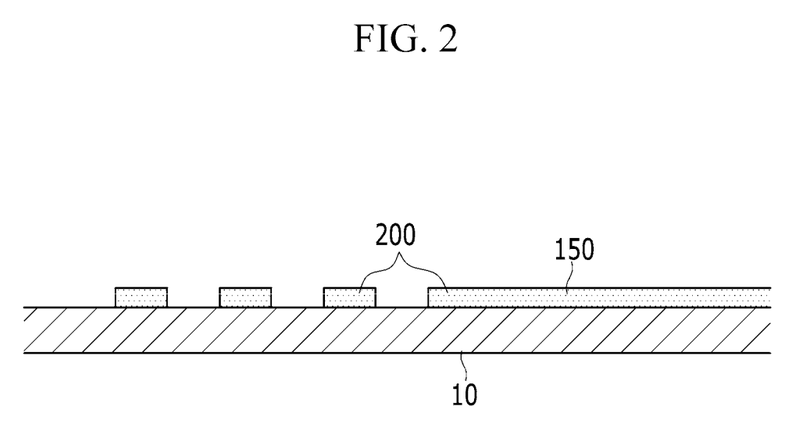
FIG. 2 is a cross-sectional view of the display device of FIG. 1, taken along line II-II'.

Referring to FIG. 1 and FIG. 2, in a cross-sectional view of the touch sensor device 1, the touch sensors 110, 120, 130, 140, 150, and 160, and the touch wires 200 may be formed on the substrate 10. The substrate 10 may be an additional substrate included in the touch sensor device 1, or a substrate or an insulating layer included in an electronic device, e.g., a display device, including the touch sensor device 1. The substrate 10 may be a flexible film, or may have rigidity.

The touch electrodes included in the touch sensors 110, 120, 130, 140, 150, and 160 may have more than a predetermined transmittance rate to transmit light. For example, the touch electrode may include a transparent conductive oxide, such as indium tin oxide (ITO) and indium zinc oxide (IZO). However, the touch electrodes may include at least one of a transparent conductive material, such as a metal nanowire, a conductive polymer such as is PEDOT, a metal mesh, carbon nanotubes (CNT), and a thin metal layer.

All of the touch electrodes included in the touch sensors 110, 120, 130, 140, 150, and 160 may be disposed at the same layer, and may be formed by using the same material.

The touch wires 200 may be disposed at the same layer as that of the touch sensors 110, 120, 130, 140, 150, and 160, may be formed by using the same material, or may be disposed at different layers. According to the present exemplary embodiment illustrated with reference to FIG. 2, the touch wires 200 are disposed at the same layer as that of the touch electrodes, and are formed by using the same material.

Hereinafter, a method of sensing a touch by the touch sensor device 1 according to an exemplary embodiment of the present invention will be described.

According to the present exemplary embodiment, the touch sensors 110, 120, 130, 140, 150, and 160 may be capacitive-type touch sensors. The touch electrodes included in the touch sensors 110, 120, 130, 140, 150, and 160 may be charged with a predetermined amount of charges by receiving a driving signal from the touch driver 500. The charged amount is changed when a contact is made by an external object such as a finger, and thus a corresponding touch signal is outputted to the touch driver 500 through the touch wires 200. The touch driver 500 may determine contact information such as a contact state or a contact position. The touch sensors may be referred to as a self-capacitance type.

Particularly, when the touch sensors 120, 130, 140, 150, and 160 include the pair of the touch electrodes 120a and 120b, 130a and 130b, 140a and 140b, 150a and 150b, 160a and 160b, of which widths of the pair of the electrodes are changed in the opposite direction, angles of a clockwise or counterclockwise direction at touch positions of the corresponding touch sensors 120, 130, 140, 150, and 160 may be precisely distinguished.

Hereinafter, a case in which the touch sensor 120 is touched by an external object, e.g., a method for distinguishing a touch position, will be described.

When an external object contacts a region of the touch sensor 120 to form a touch area, the touch area may include a first area overlapping the first touch electrode 120a and a second region overlapping the second touch electrode 120b. In the first area, the finger and the first touch electrode 120a may constitute a first capacitor, and in the second area, the finger and the second touch electrode 120b may constitute a second capacitor. Capacitances of the first capacitor and the second capacitor are respectively proportional to the areas of the first area and the second area.

The widths of the first and second touch electrodes 120a and 120b are gradually changed along the clockwise or counterclockwise direction with respect to the central point O. Accordingly, when the external object touches different areas of the touch sensor 120, the capacitances and changes of the charged amounts in the first capacitor and the second capacitor may be different in each touched areas. Accordingly, an azimuthal angle from a reference line of the touch position in the touch sensor 120, e.g., an angle from the imaginary boundary lines CL1 and CL2, may be sensed by using the differences.

Further, touches made at positions having different distances from the central point O may be distinguished by concentrically disposing the touch sensors 110, 120, 130, 140, 150, and 160 at different distances from the central points.

Accordingly, a touch position in the touch sensing area TA may be precisely determined, as polar coordinates, i.e., both a distance (referred to as a radius) from the central point O and an angle (referred to as an azimuthal angle) from an initial line may be sensed. Further, since the touch position is determined by using polar coordinates, which may be implemented on the touch sensor device 1 that has the touch sensing area TA of a non-quadrangular, particularly, circular shape, a user interface/experience (UI, UX) appropriate for a circular touch sensor device may be embodied.

Figure 3:
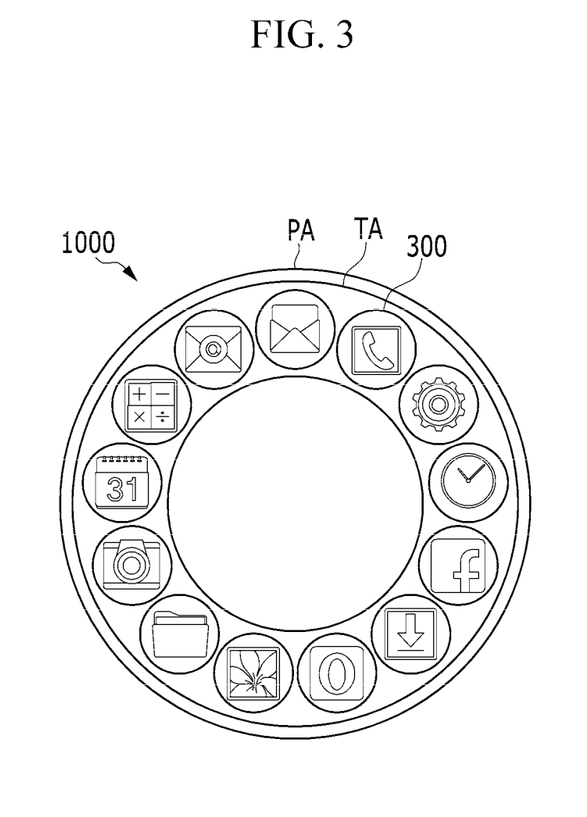
FIG. 3 illustrates a display device including a touch sensor device according to an exemplary embodiment of the present invention.
Figure 4:
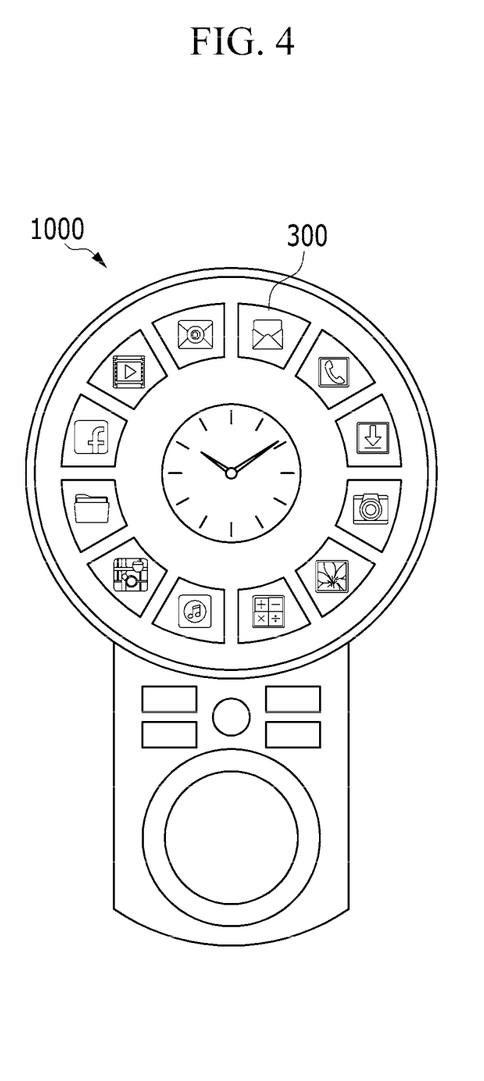
FIG. 4 illustrates a display device including a touch sensor device according to an exemplary embodiment of the present invention.

FIG. 3 and FIG. 4 illustrate a display device including a touch sensor device according to an exemplary embodiment of the present invention.

A display device 1000 including the touch sensor device according to the present exemplary embodiment may include a display area corresponding to the non-quadrangular (e.g., circular or elliptical) touch sensing area TA. The display area may have an area positioned at the peripheral area PA. Icons 300 serving as user interfaces may be displayed on the display area TA. When the touch sensing area TA and the display area have circular shapes, the icons 300 may have circular shapes for convenient touches of users. When polar coordinates are employed to recognize a touch position in the display device 1000, the touch position may be determined precisely in most regions of the touch sensing area TA and a driving method of the touch sensor device may be simplified.

According to the present exemplary embodiment, all electrodes included in the touch sensors 110, 120, 130, 140, 150, and 160 may be positioned at the same layer and formed by using the same layer, thereby constituting a single layer. Accordingly, a manufacturing process and time may be reduced, thereby increasing price competitiveness thereof as compared with conventional touch sensors that are disposed at multiple layers.

According to the exemplary embodiment illustrated in FIG. 1, the touch sensing area TA is divided into four domains A1, A2, A3, and A4 by two imaginary boundary lines CL1 and CL2 extending through the central point O. However, the number of domains may be determined according to conditions such as user interfaces, driving methods, and the like. Particularly, when the number of domains A1, A2, A3, and A4 is determined as four or more, the touch position may be precisely recognized.

Hereinafter, a touch sensor device according to an exemplary embodiment of the present invention will be described with reference to FIG. 5 as well as the aforementioned drawings.

Figure 5:
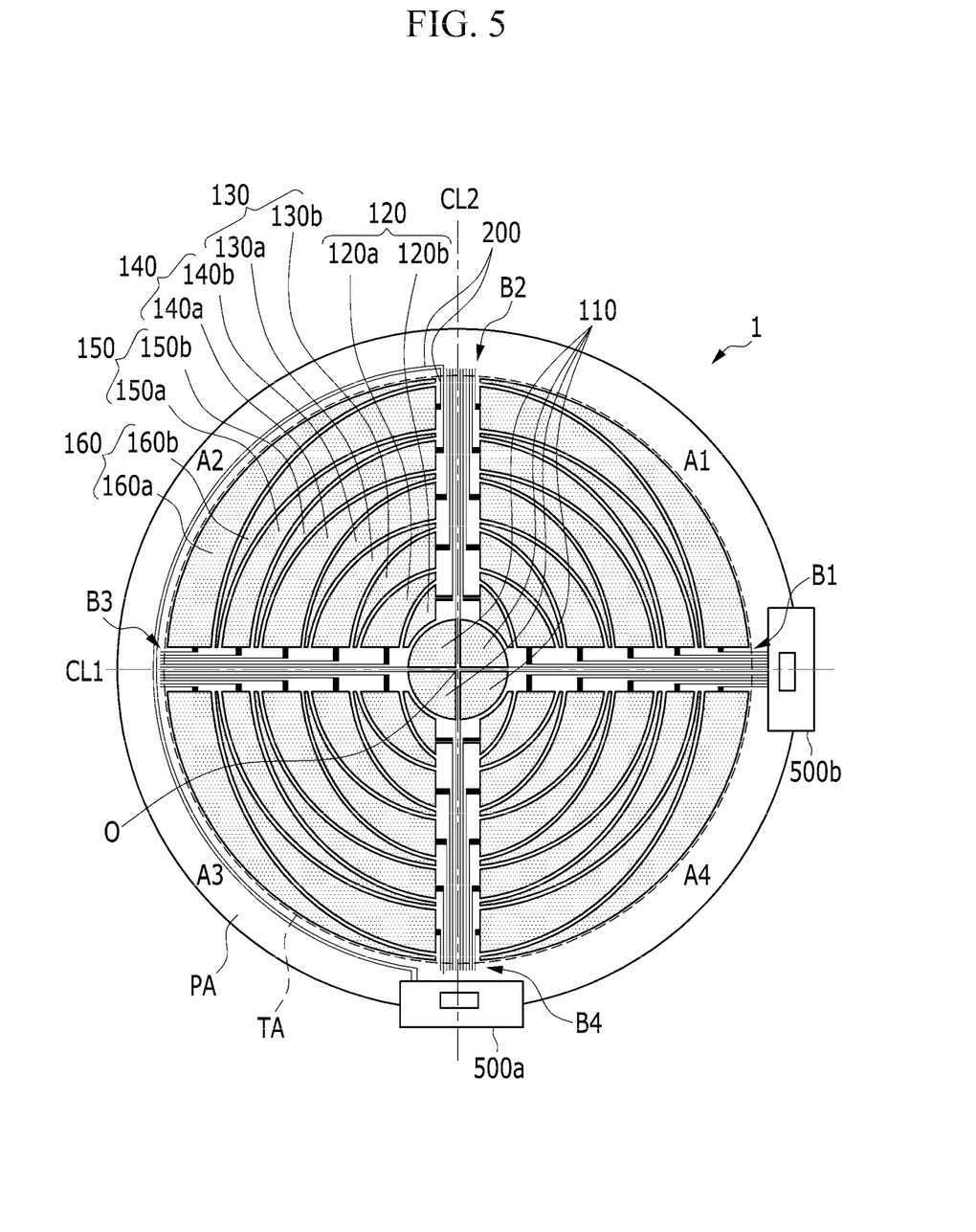
FIG. 5 is a top plan view illustrating a touch sensor device according to an exemplary embodiment of the present invention.

FIG. 5 is a top plan view illustrating a touch sensor device according to an exemplary embodiment of the present invention.

Referring to FIG. 5, a touch sensor device 1 according to the present exemplary embodiment is substantially the same as the touch sensor device illustrated with reference to FIG. 1 and FIG. 2, except that the touch sensor device 1 may include touch drivers 500a and 500b for driving the touch sensors. More particularly, the touch drivers may be disposed at multiple positions.

Referring to FIG. 5, the touch sensor device 1 includes two touch drivers 500a and 500b. However, the touch sensor device 1 may include three or more touch drivers. A first touch driver 500a may be disposed at a portion corresponding to the imaginary boundary line CL2 in the peripheral area PA, and a second touch driver 500b may be disposed at a portion corresponding to the imaginary boundary line CL1 in the peripheral area PA.

When the touch sensor device 1 includes touch drivers 500a and 500b positioned at different areas of the touch sensor device 1, the number of touch wires 200 formed in the peripheral area PA may be reduced, thereby reducing an area of the peripheral area PA of the touch sensor device 1. As a result, it may be possible to implement a narrow bezel.

Hereinafter, a touch sensor device according to an exemplary embodiment of the present invention will be described with reference to FIG. 6 as well as the aforementioned drawings.

Figure 6:
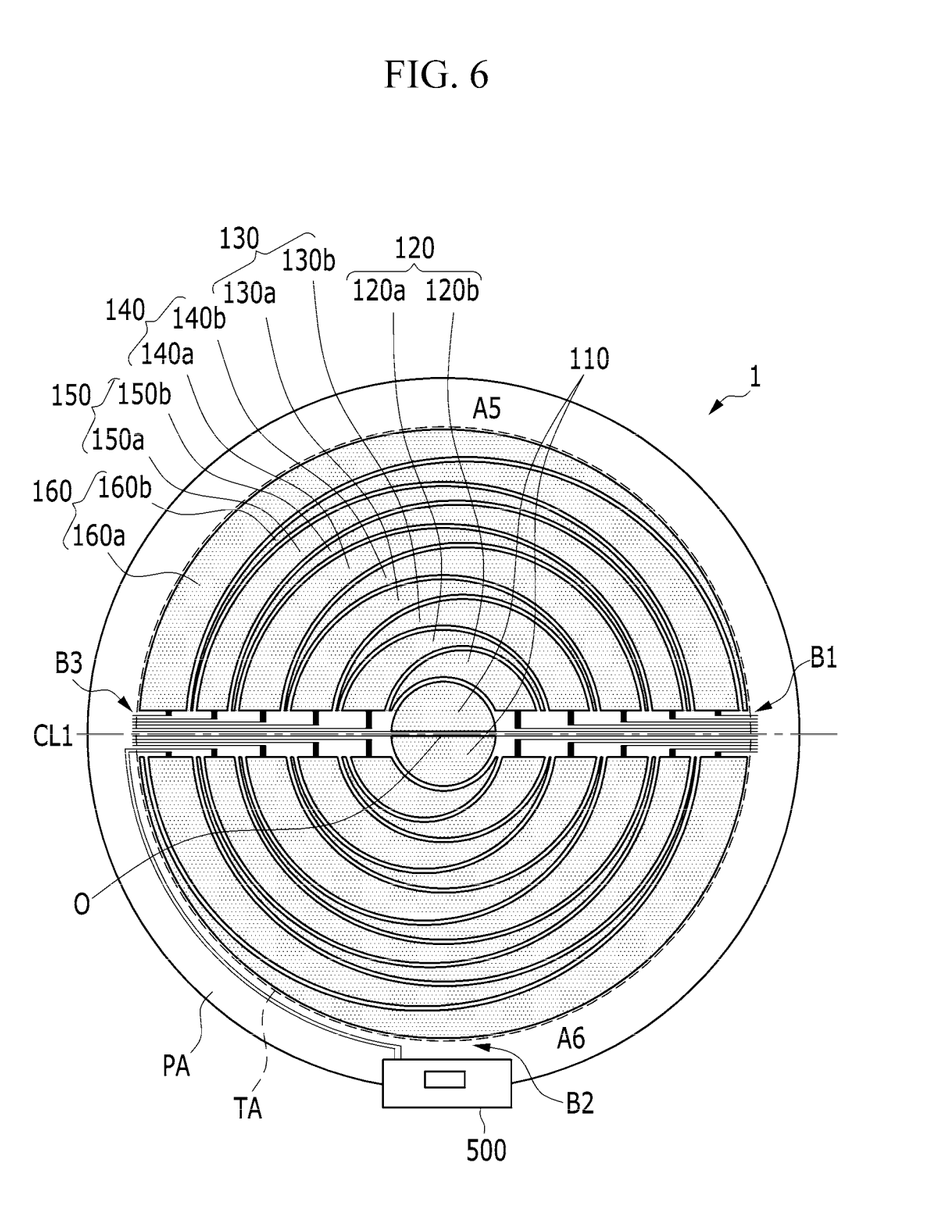
FIG. 6 is a top plan view illustrating a touch sensor device according to an exemplary embodiment of the present invention.

FIG. 6 is a top plan view illustrating a touch sensor device according to an exemplary embodiment of the present invention.

Referring to FIG. 6, the touch sensor device 1 according to the present exemplary embodiment is substantially the same as the touch sensor device illustrated in FIG. 1 and FIG. 2, except that the touch sensing area TA is divided into two domains A5 and A6 by one boundary line CL1.

The two divided domains A5 and A6 may have substantially the same areas, and may be formed to be symmetrical to each other. Boundary areas B1 and B3 serving as peripheral areas of the boundary line CL1 extending through the central point O may be formed between the adjacent domains A5 and A6. A touch sensor is disposed at each of the domains A5 and A6 of the touch sensing area TA.

The touch sensor disposed at each of the domains A5 and A6 includes touch sensors 110, 120, . . . , and 160, which are disposed sequentially from the central point O toward the outside. Each of the touch sensors 110, 120, . . . , and 160 may have a semi-circular or semi-arc shape. Areas of the touch sensors 110, 120, . . . , and 160 may be increased as they are positioned farther away from the central point O.

The touch sensor device 1 includes touch wires 200 connected to the touch electrodes included in the first touch sensor 110 and a pair of the touch electrodes 120a, 120b, . . . , 160a, and 160b respectively included in the touch sensors 120, . . . , and 160. The touch wires 200 may include portions positioned in the boundary area B1 and B3 and/or portions positioned in the peripheral area PA.

The touch wires 200 may be connected to the touch driver 500 disposed in the peripheral area PA. The touch driver 500 may be disposed in the peripheral area PA corresponding to a region between the adjacent domains A5 and A6.

The touch wires 20 connected to the touch electrodes 120a, 120b, . . . , 160a, and 160b may be connected to a widest portion of each of the touch electrodes 120a, 120b, . . . , 160a, and 160b.

The aforementioned characteristics and effects of the touch sensor device and the display device including the same illustrated with reference to FIGS. 1 to 5 may be applicable to the present exemplary embodiment illustrated in FIG. 6.

Exemplary embodiments of the present invention illustrated with reference to FIGS. 1 to 6 include a touch sensor device, which are divided into multiple by at least one imaginary boundary line CL1 and CL2. However, according to an exemplary embodiment of the present invention, the touch sensing area TA may exclusively include one domain, and may include multiple touch sensors disposed at different distances from the central point O. The touch sensors may be disposed in a concentric form including different radiuses, and each of the touch sensors may include a pair of touch electrodes, which are disposed to face each other and have widths that are changed. In this case, each of the touch electrodes may be formed at an azimuthal angle that is substantially close to 360 degrees, and widths thereof may be changed according to the azimuthal angle. Further, the first touch sensor 110 which is closest to the central point O may have a substantially circular shape.

Other characteristics are the same as those of the aforementioned exemplary embodiments, and thus repeated description thereof will be omitted.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch sensor device, comprising:
    a touch sensing area divided into a plurality of domains, each of the plurality of domains including a plurality of touch sensors sequentially disposed in a first direction extending away from an imaginary central point; and
    touch wires connected to the plurality of touch sensors, wherein:
    the plurality of domains comprises a first domain, a second domain, a third domain, and a fourth domain adjacent to each other;
    an area of each touch sensor in the same domain gradually increases as a distance thereof away from the imaginary central point increases;
    each of the domains includes:
        a first touch sensor disposed closest to the imaginary sensor point, the first touch sensor comprising only one touch electrode that has a shape of a quadrant circle; and
        a second touch sensor disposed adjacent to the first touch sensor, the second touch sensor comprising a first touch electrode and a second touch electrode, the first touch electrode being disposed between the second touch electrode and the only one touch electrode of the first touch sensor;
    a width of the first touch electrode decreases along a second direction;
    a width of the second touch electrode increases along the second direction;
    each of the first and second touch electrode has three sides, and the touch wires are connected to the shortest side among the three sides;
    the only one touch electrode of the first touch sensor includes a first arc, which is an entire outer side edge of the only one touch electrode of the first touch sensor that faces the first touch electrode of the second touch sensor, and the first touch electrode of the second touch sensor includes a second arc, which is an entire inner side edge of the first touch electrode of the second touch sensor that directly faces the only one touch electrode of the first touch sensor;
    a length of the second arc is shorter than a length of the first arc; and
    the touch wires include a first touch wire which extends along outermost edges of the first domain and the second domain in a peripheral area outside the touch sensing area.

2. The touch sensor device of claim 1, wherein the second direction is a clockwise or counterclockwise direction with respect to the imaginary central point.

3. The touch sensor device of claim 2, wherein
    the touch sensors are respectively disposed in each domain.

4. The touch sensor device of claim 3, wherein the first touch electrode and the second touch electrode are disposed on the same layer and comprise the same material.

5. The touch sensor device of claim 4, further comprising:
    at least one touch driver connected to the touch wires.

6. The touch sensor device of claim 4, wherein the touch wires are disposed on the same layer as the first and second touch electrodes, and comprise the same material as the first and second touch electrodes.

7. The touch sensor device of claim 4, further comprising:
    touch drivers connected to the touch wires and disposed in the peripheral area outside the touch sensing area,
    wherein each of the touch drivers is disposed in a boundary area between adjacent domains.

8. The touch sensor device of claim 1, wherein the first touch electrode and the second touch electrode are disposed on the same layer and comprise the same material.

9. The touch sensor device of claim 1, wherein
    the touch sensors are respectively disposed in each domain.

10. The touch sensor device of claim 9, wherein the touch wires are disposed on the same layer as the first and second touch electrodes and comprise the same material as the first and second touch electrodes.

* * * * *